United States Patent
Larsen

(10) Patent No.: US 8,298,721 B2
(45) Date of Patent: Oct. 30, 2012

(54) METAL SUPPORTED SOLID OXIDE FUEL CELL

(75) Inventor: Peter Halvor Larsen, Roskilde (DK)

(73) Assignee: Technical University of Denmark, Lyngby (DK)

(*) Notice: Subject to any disclaimer, the term of this patent is extended or adjusted under 35 U.S.C. 154(b) by 1099 days.

(21) Appl. No.: 12/199,654

(22) Filed: Aug. 27, 2008

(65) Prior Publication Data

US 2009/0061279 A1 Mar. 5, 2009

(30) Foreign Application Priority Data

Aug. 31, 2007 (DK) .................................. 2007 01242

(51) Int. Cl.
  H01M 8/12 (2006.01)
  H01M 4/88 (2006.01)
(52) U.S. Cl. .................... 429/496; 429/533; 427/115
(58) Field of Classification Search .................. 429/496
  See application file for complete search history.

(56) References Cited

U.S. PATENT DOCUMENTS

| | | | |
|---|---|---|---|
| 3,464,861 A | 9/1969 | Williams et al. | |
| 5,132,352 A * | 7/1992 | Richards et al. | 524/403 |
| 5,358,735 A * | 10/1994 | Kawasaki et al. | 427/115 |
| 7,351,488 B2 * | 4/2008 | Visco et al. | 429/486 |
| 2003/0151156 A1 | 8/2003 | Crumm et al. | |
| 2004/0214070 A1 | 10/2004 | Simner et al. | |
| 2009/0023050 A1* | 1/2009 | Finnerty et al. | 429/44 |

FOREIGN PATENT DOCUMENTS

| | | |
|---|---|---|
| EP | 1 359 635 A1 | 11/2003 |
| EP | 1 372 204 A2 | 12/2003 |
| EP | 1 760 817 | 3/2007 |
| EP | 1 768 205 | 3/2007 |
| GB | 1 228 837 A | 4/1971 |
| WO | WO 03/094268 A2 | 11/2003 |
| WO | WO 2004/030133 | 4/2004 |
| WO | WO 2005/122300 | 12/2005 |
| WO | WO 2006/082057 | 8/2006 |

OTHER PUBLICATIONS

Alman et al., "The Effect of Cerium Surface Treated Ferritic Stainless Steel Current Collectors on the Performance of Solid Oxide Fuel Cells (SOFC)" Journal of Power Sources, 168, pp. 351-355, 2007.

* cited by examiner

Primary Examiner — John S Maples
(74) Attorney, Agent, or Firm — Dickstein Shapiro LLP

(57) ABSTRACT

A reversible solid oxide fuel cell obtainable by a method comprising the steps of:
  providing a metallic support layer;
  forming a cathode precursor layer on the metallic support layer;
  forming an electrolyte layer on the cathode precursor layer;
  sintering the obtained multilayer structure;
  in any order conducting the steps of:
    forming a cathode layer by impregnating the cathode precursor layer, and
    forming an anode layer on the electrolyte layer;
characterised in that the method further comprises prior to forming said cathode layer,
  impregnating a precursor solution or suspension of a barrier material into the metallic support layer and the cathode precursor layer and subsequently conducting a heat treatment.

10 Claims, 1 Drawing Sheet

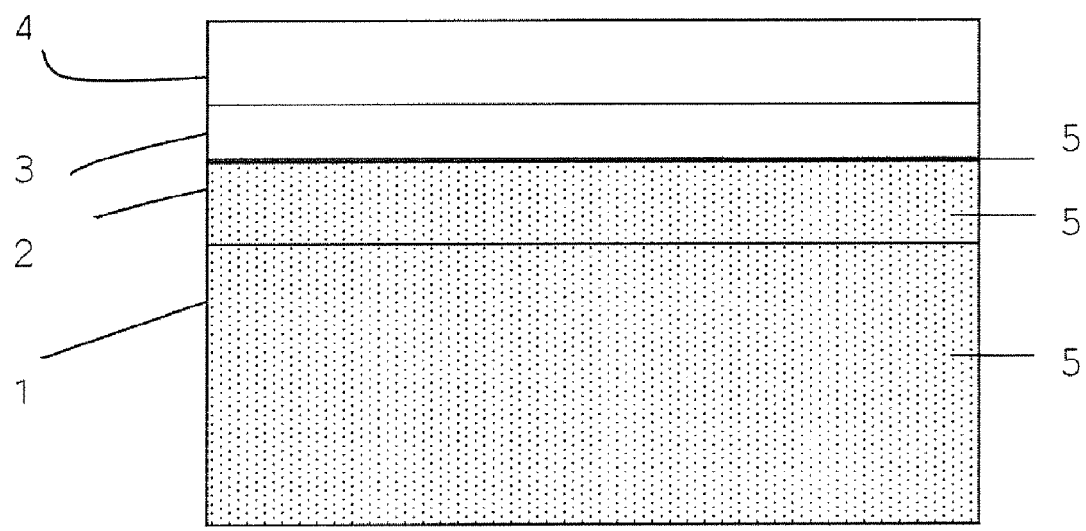

METAL SUPPORTED SOLID OXIDE FUEL CELL

FIELD OF THE INVENTION

The present invention relates to (reversible) solid oxide fuel cells (SOFC) comprising an anode support or a metallic support and protected with a barrier material incorporated within the fuel cell. Particularly, the invention relates to (reversible) solid oxide fuel cells (SOFC) comprising a metallic support with the cathode on the metal support side and a barrier material impregnated into the metallic support layer and cathode precursor layer. The invention relates also to metal supported solid oxide fuel cells protected on the anode side, in which the barrier material is also impregnated into an anode precursor layer. The invention relates also to anode supported solid oxide fuel cells with the barrier material impregnated into the cathode precursor layer of such cells.

BACKGROUND OF THE INVENTION

Conventional manufacture processes of solid oxide fuel cells (SOFCs) include the provision of a metallic support, the formation of an anode layer thereon followed by the application of an electrolyte layer. The so formed half cell is dried and afterwards sintered often in a reducing atmosphere. Finally, a cathode layer is formed thereon so as to obtain a complete cell. However, during the sintering of the half cell undesired reactions between the metal support and anode materials occur resulting in a negative impact on the overall cell performance.

WO-A2-2005/122300 relates to a solid oxide fuel cell with the anode on the metal support side comprising a metallic support ending in a substantially pure electron conducting oxide that prevents the reaction of metals of the anode with said metallic support, which is normally a ferritic stainless steel. The complete cell contains on top of the metallic support, an active anode layer, an electrolyte layer, an active cathode layer and a transition layer to a cathode current collector of a single phase LSM. A discrete barrier layer is provided between the electrolyte layer and the cathode layer in order to increase the lifetime of the cathode layer by preventing the diffusion of cations from the cathode layer into the electrolyte layer.

WO-A2-2006/082057 discloses a fuel cell in which the cathode layer is provided on a metallic support normally a ferritic stainless steel support enabling thereby the provision of robust cell which at the same time eliminates the problem of deterioration of the metallic support otherwise encountered in designs, where the anode layer is provided on the metal support side. By having the cathode layer on a metallic support the reactions of active anode components such as Ni with the ferritic steel of the support are avoided. A discrete barrier layer of doped ceria is provided in between the electrolyte and the cathode layer to prevent the diffusion of cations from the cathode to the electrolyte. The provision of the cathode on the metallic support side enables a more robust cell. The degrees of freedom in choice of anode material are increased and at the same time redox stability is enhanced. However, corrosion of the metallic support may still take place and severely impair the applicability of this otherwise attractive cell design. Moreover, at the operating temperatures of SOFC often between 700° C. and 900° C., chromium present in the metallic support, which is normally ferritic stainless steel, has a strong tendency to migrate into the cathode and severely impair the performance of the cell by significantly decreasing the power density due to degradation of the cell. This phenomenon is known in the art as Cr-poisoning.

D. E. Alman et al. Journal of Power Sources 168 (2007) 351-355 describe the preparation of a fuel cell in which a thin and dense metal sheet of ferritic stainless steel is perforated to form a current collector with a slotted pattern which allows the passage of air to the cathode. The perforated metal sheet is then coated with ceria and subsequently attached to the anode or cathode side of a button cell. The button cells contain a thin Gd-doped ceria layer at the electrolyte-cathode interface. The provision of a ceria coating on the metal surface (as a thin oxide layer) reduces cell degradation due to Cr poisoning. However, only the outer surface of the metal is covered with the ceria.

It would be desirable to be able to provide solid oxide cells which are robust and with higher corrosion stability and higher resistance against Cr-poisoning than prior art cells.

SUMMARY OF THE INVENTION

We have now found that by providing a barrier material throughout the layers of the cell, it is possible to enhance the corrosion stability of the metal support as well as other metal components present in the structure such as interconnects. By providing a barrier material that is deposited on the electrolyte layer, but which penetrates into the cathode precursor layer and the metallic support layer, interface reactions between air electrode (cathode) materials and the electrolyte material are prevented, whilst at the same time the corrosion stability of the metal support is enhanced and Cr-poisoning of the cathode is avoided.

According to the invention, we provide a reversible solid oxide fuel cell obtainable by a method comprising the steps of:
 providing a metallic support layer;
 forming a cathode precursor layer on the metallic support layer;
 forming an electrolyte layer on the cathode precursor layer;
 sintering the obtained multilayer structure;
 in any order conducting the steps of:
  forming a cathode layer by impregnating the cathode precursor layer, and
  forming an anode layer on the electrolyte layer;
characterised in that the method further comprises prior to forming said cathode layer,
 impregnating a precursor solution or suspension of a barrier material into the metallic support layer and the cathode precursor layer and subsequently conducting a heat treatment.

The precursor solution or suspension of barrier material is thereby impregnated into the metallic support layer and the cathode precursor layer. Yet, the barrier material may also be impregnated into other layers of the solid oxide fuel cell, such as into transition layer(s) as defined below. As a result of the process the electrolyte will also be covered by the barrier material. The electrolyte layer is gas-tight and therefore the barrier material is applied on it rather than into it. The barrier material is then deposited on the side of the electrolyte layer facing the cathode, before forming said cathode layer. This eliminates undesired reactions between cathode and electrolyte materials, particularly between La and/or Sr oxides in the cathode and $ZrO_2$ in the electrolyte, which tend to react and form electrically insulating interface layers in the cell and thereby reduce its electrochemical activity.

As used herein the term reversible solid oxide fuel cell means that the reactions of the fuel cell are reversed when the current in the cell is reversed and the solid oxide cell (SOC) acts as an electrolyser (SOEC).

As used herein the terms multilayer structure and half cell are used interchangeably. These terms encompass a layered structure containing the metallic support layer, optionally one or more transition layer(s), cathode precursor layer(s) and the electrolyte layer. For cells in which the electrolyte is directly attached to the metal support the term multilayer structure encompasses a layered structure containing the metallic support layer, optionally one or more transition layer(s) and the electrolyte layer. The term multilayer structure may also encompass embodiments in which additionally one or more anode precursor layer(s) are provided or embodiments in which the support is other than metallic e.g. anode supported structures.

The barrier material is able to penetrate in the cell and is distributed on the grain surfaces in the cathode compartment comprising the porous metal support and precursor layer and on the surface of the dense electrolyte. The current invention encompasses therefore metal supported cells with an impregnated barrier material that is dispersed throughout the layers of the fuel cell preferably all others than the anode layer, but still deposited on the surface of the electrolyte facing the cathode side. The barrier material prevents interface reactions between cathode (air electrode) materials and the electrolyte material, such as the diffusion of cations from the cathode catalyst to the electrolyte layer and to the cathode precursor, thereby increasing the electrical performance and the lifetime of the cell. The barrier material prevents also chromium migration from the metal support into the cathode. The barrier material enhances the corrosion stability of the metal support as well as other metal components present in the structure such as interconnects by impeding or at least severely restricting the passage of oxygen into these layers.

The invention also encompasses a cell in which the electrolyte is directly attached to the metal support. Accordingly, we also provide a reversible solid oxide fuel cell obtainable by a method comprising the steps of:
providing a metallic support layer;
forming an electrolyte layer on the metallic support layer;
sintering the obtained multilayer structure;
in any order conducting the steps of:
forming a cathode layer by impregnating the metallic support layer, and
forming an anode layer on the electrolyte layer;
characterised in that the method further comprises prior to forming said cathode layer,
impregnating a precursor solution or suspension of a barrier material into the metallic support layer and the electrolyte layer and subsequently conducting a heat treatment.

Hence, in this case the metal support acts as a cathode precursor layer.

In an alternative embodiment of the invention a metal supported cell is also protected on the anode side. For this purpose a precursor layer of the anode is also provided and forming or completing the anode takes place before forming or completing the cathode layer.

Accordingly, the step of forming an anode layer on the electrolyte layer is conducted prior to the step of forming a cathode layer (by e.g. impregnating the cathode precursor layer or metallic support layer) and comprises:
forming an anode precursor layer on the electrolyte layer prior to sintering the obtained multilayer structure,
after sintering the obtained multilayer structure, impregnating the anode precursor layer with a precursor solution or suspension comprising compounds selected from the group consisting of Ni, Ce, Gd and mixtures thereof, the method further comprising prior to forming said cathode and anode layers,
impregnating a precursor solution or suspension of a barrier material into the metallic support layer, cathode precursor layer and anode precursor layer and subsequently conducting a heat treatment.

More specifically, according to this embodiment a reversible solid oxide fuel cell is obtainable by a method comprising the steps of:
providing a metallic support layer;
forming a cathode precursor layer on the metallic support layer;
forming an electrolyte layer on the cathode precursor layer;
forming an anode precursor layer on the electrolyte layer;
sintering the obtained multilayer structure;
forming an anode layer by impregnating the anode precursor layer with a precursor solution or suspension comprising compounds selected from the group consisting of Ni, Ce, Gd and mixtures thereof;
forming a cathode layer by impregnating the cathode precursor layer,
the method further comprising prior to forming said cathode and anode layers,
impregnating a precursor solution or suspension of a barrier material into the metallic support layer, cathode precursor layer and anode precursor layer and subsequently conducting a heat treatment.

For instance, after providing the metallic support, cathode precursor layer, electrolyte layer and anode precursor layer, the samples may be punched out in the desired dimensions and sintered under reducing conditions. After sintering, the barrier material is impregnated into the metallic support, cathode and anode precursor layers and onto the electrolyte layer. The impregnation of the barrier material is conducted at least once and after impregnation the samples are heat treated, for instance at 400° C. for 1 hour. The metallic support is masked and the anode layer is formed by impregnating a nitrate solution containing Ni, Ce and Gd. After drying, the metallic support mask is removed and the anode layer is masked. A cathode layer is then formed by impregnating the cathode precursor layer with a suitable nitrate solution comprising e.g. La, Sr, Fe, Co, Ce and Gd. Alternatively, a colloid suspensions of $(La_{1-x}Sr_x)_s(Co_yFe_{1-y})O_{3-\delta}$ (LSCF) and $Ce_{1-x}Gd_xO_{2-\delta}$ (CGO) and/or NiO and CGO may be impregnated, respectively.

Where the electrolyte is directly attached to the metal support a reversible solid oxide fuel cell is obtainable by a method comprising the steps of:
providing a metallic support layer;
forming an electrolyte layer on the metallic support layer;
forming an anode precursor layer on the electrolyte layer;
sintering the obtained multilayer structure;
forming an anode layer by impregnating the anode precursor layer with a precursor solution or suspension comprising compounds selected from the group consisting of Ni, Ce, Gd and mixtures thereof;
forming a cathode layer by impregnating the metallic support layer,
the method further comprising prior to forming said cathode and anode layers,
impregnating a precursor solution or suspension of a barrier material into at least the metallic support layer and the anode precursor layer and subsequently conducting a heat treatment.

By having electrode precursor layers (cathode and anode precursor layers) on both sides corrosion protection of the metal on the anode side is achieved while still having the cathode on the metal support side.

Regardless of the embodiment chosen, the barrier material is preferably provided after sintering of the multilayer structure by vacuum infiltration, whereby impregnation throughout the multilayer structure i.e. half cell is obtained.

Preferably, the barrier material comprises ceria, more preferably doped ceria such as $(Ce_{0.9}Gd_{0.1})O_{2-\delta}$ (i.e. CGO10) or $(Ce_{0.9}Sm_{0.1})O_{2-\delta}$ (i.e. CSO10).

The precursor solution or suspension of barrier material is preferably a nitrate solution of doped ceria, for instance a nitrate solution of Gd doped ceria $((Ce_{0.9}Gd_{0.1})O_{2-\delta})$ or a colloidal suspension of doped ceria particles having average diameter of 2-100 nm, preferably 30-100 nm, more preferably 30-80 nm.

For the metal supported embodiments, it would be understood that after sintering the half cell consisting of the metallic support layer, cathode precursor and electrolyte, a barrier material is impregnated into the porous structure of such half cell. The electrolyte layer is very dense and therefore this layer is not part of this porous structure. The barrier material covers the surfaces in the porous half cell as well as the surface on the electrolyte. After impregnation of the barrier material an active cathode is impregnated in form of a pure catalyst (e.g. $(La_{1-x}Sr_x)_sCoO_{3-\delta}$, LSC) or a composite (e.g. LSCF and CGO). The opposite side of the electrolyte can be coated with any suitable anode.

Normally the anode gas contains more than 50 vol % water which may cause severe corrosion problems in the metal support. The provision of the cathode on the metal support side and the barrier material enables therefore also a higher degree of freedom in the anode choice and it is even possible to have a redox stable Ni based anode.

The two step impregnation, first the impregnation of the precursor of barrier material and then the impregnation of the active cathode material so as to form a cathode layer results in a dual protective effect of the metallic support. Thereby, fuel cells which are mechanically robust with better performance and longer lifespan are obtained.

In yet another embodiment the method of preparing the reversible solid oxide fuel cell further comprises providing one or more intermediate transition layers between said metallic support layer and said cathode precursor layer. The transition layer represents a bonding layer of metal and ceramic materials that reduces thermal stress caused by the difference in thermal expansion coefficients (TEC) of the metallic support and cathode. The transition layer consists preferably of a mixture of metal and oxide material.

Preferably, a heat treatment at e.g. 200° C. for about 2 hrs is conducted subsequent to the provision of the precursor solution or suspension of barrier material and before forming the cathode layer. The heat treatment may also be conducted at 300° C., 400° C., 500° C., 600° C., 700° C. for about 1, 2 or 3 hrs. This heat treatment ensures the decomposition of the precursor solution or suspension of barrier material for instance the nitrate of the nitrate solution of doped ceria $((Gd_{0.1}Ce_{0.9})O_{2-\delta})$ thereby fixing the barrier material within the layers of the fuel cell. The impregnation procedure may be repeated several times preferably 2 to 5 times in order to ensure as much penetration of the barrier material into the cell as required to obtain a dense barrier layer. The heat treatment may be conducted after each impregnation.

The metallic support layer has a porous volume of below 70 vol % often in the range 10-60 vol % and an average pore size of 1-50 μm, preferably 2-10 μm. The porous metallic support layer enables the transport of gases and comprises preferably a FeCrMx alloy, wherein Mx is selected from the group consisting of Ni, Ti, Ce, Mn, Mo, W, Co, La, Y, Al and mixtures thereof and from about 0 to about 50 vol % metal oxides, and wherein the metal oxide is selected from the group of doped zirconia, doped ceria, Mg/Ca/SrO, $CoO_x$, $MnO_x$, $B_2O_3$, $CuO_x$, $ZnO_2$, $VO_x$, $Cr_2O_3$, FeO, $MoO_x$, $WO_3$, $Ga_2O_3$, $Al_2O_3$, $TiO_2$ and mixtures thereof. The addition of one or more of said oxides enhances the chemical bonding between the electrode layer and the metal support, at the same time adjusts the TEC (thermal expansion coefficient) of the respective layers so as to reduce the TEC difference thereof. Also, said oxides may be used to control the sinterability and grain growth of the layer. In the case of, for example, MgO, or $CoO_x$, the TEC difference will increase, whereas in case of, for example, $Cr_2O_3$, $Al_2O_3$, $TiO_2$, zirconia and possibly ceria, the TEC will be reduced. Thus, the addition of the respective oxide can be used to control the TEC difference as desired.

In a further preferred embodiment, the $FeCrM_x$ porous support layer comprises an oxide layer on all internal and external surfaces. Said oxide layer may be formed by oxidation of the $FeCrM_x$ alloy itself in a suitable atmosphere. Alternatively, the oxide layer may be coated on the alloy. The oxide layer advantageously inhibits the corrosion of the metal. Suitable oxide layers comprise for example $Cr_2O_3$, $CeO_2$, $LaCrO_3$, $SrTiO_3$ and mixtures thereof. The oxide layer may preferably furthermore be suitably doped, e.g. by alkaline earth oxides.

In a particular embodiment the metallic support is provided as a powder suspension of FeCrMx alloy, preferably Fe22CrTi0.04, mixed with $Zr_{0.94}Y_{0.06}Zr_{2-\delta}$.

The thickness of the metallic support layer of the present invention is preferably in the range of about 100 μm to about 2000 μm, and more preferably of about 250 μm to about 1000 μm.

As mentioned above, the cathode layer is formed by impregnating said cathode precursor layer with an active cathode in the form of a pure catalyst such as LSC or a composite such as a LSCF/CGO composite. The impregnation of the cathode precursor layer may be conducted with a solution or suspension of the active cathode such as a nitrate solution, or a colloidal suspension with an average particle size of 30-100 nm of the active cathode.

The finally formed cathode layer may comprise doped zirconia and/or doped ceria and/or a $FeCrM_x$ alloy, for example scandia and yttria stabilized zirconia (ScYSZ), and further at least one material selected from the group consisting of: $(La_{1-x}Sr_x)_sMnO_{3-\delta}$ and $(A_{1-x}B_x)_s(Fe_{1-y}Co_y)O_{3-\delta}$ where A=La, Gd, Y, Sm, Ln or mixtures thereof, and B=Ba, Sr, Ca, or mixtures thereof, and Ln=lanthanides; for instance lanthanum strontium manganate (LSM), lanthanide strontium manganate $((Ln_{1-x}Sr_x)_sMnO_3$, lanthanide strontium iron cobalt oxide $(Ln_{1-x}Sr_x)_s(Fe_{1-y}Co_y)O_3$, preferably La, $(Y_{1-x}Ca_x)_s(Fe_{1-y}Co_y)O_3$, $(Gd_{1-x}Sr_x)$ $(Fe_{1-y}Co_y)O_3$, $(Gd_{1-x}Ca_x)$ $(Fe_{1-y}Co_y)O_3$, and mixtures thereof.

It has been found that a cathode layer comprising said composite material exhibits a better cathode performance, as compared to other cathode materials known in the art. The thickness of the cathode layer is preferably in the range of about 10 μm to about 100 μm, and more preferably of about 15 μm to about 40 μm.

The electrode precursor layers are converted to the respective electrode (anode, cathode) layers by impregnation, preferably vacuum infiltration with active material after sintering. Impregnation of the active material in the electrode precursor layer may also be conducted under pressure i.e. by pressure impregnation. Pressure impregnation is particularly suitable where the electrode layer is formed by impregnation of nano-sized suspensions, e.g. when forming a cathode layer by impregnation of a nano-sized suspension of ferrites and/or cobaltites with average size of particles in the range 30-80 nm. The impregnation may be conducted at least once preferably up to five or seven times. If the precursor layer is converted into an anode, impregnation is conducted with for example Ni with or without doped ceria or with Ni with or without doped zirconia. Preferably, the impregnation of the anode precursor layer is carried out with a solution or suspension comprising compounds selected from the group consisting of Ni, Ce, Cd and mixtures thereof; for instance with a solution comprising a nitrate of Ni, Ce, Gd or mixtures thereof. The preferred method is impregnation of a suspension of Ni(O) and CGO.

The anode precursor layer is preferably formed from a composition of $Zr_{0.78}Sc_{020}Y_{0.02}O_{2-\delta}$ optionally mixed with Fe22Cr or more preferably $Ce_{0.9}Gd_{0.1}O_2$ optionally mixed with Fe22Cr.

If the precursor layer is converted into a cathode layer, the impregnation may be carried out with ferrites or cobaltites. As used herein ferrites and/or cobaltites are crystalline compounds with the general formula $(Ln_{1-x}Sr_x)_s(Fe_{1-y}Co_y)O_3$, Ln=lanthanide, preferably La. Alternatively other compounds may be utilised such as $(Ln_{1-x}Sr_x)_sMnO_3$, $Y_{1-x}Ca_x)_s (Fe_{1-y}Co_y)O_3$, $(Gd_{1-x}Sr_x)$ $(Fe_{1-y}Co_y)O_3$, $(Gd_{1-x}Ca_x) (Fe_{1-y}Co_y)O_3$ and mixtures thereof.

Hence, the cathode layer comprises doped zirconia and/or doped ceria and/or a FeCrMx alloy, and further at least one material selected from the group consisting of lanthanum strontium manganate (LSM), lanthanide strontium manganate $((Ln_{1-x}Sr_x)MnO_3$, lanthanide strontium iron cobalt oxide $(Ln_{1-x}Sr_x)_s(Fe_{1-y}Co_y)O_3$, Ln=lanthanide, preferably La, $(Y_{1-x}Ca_x)(Fe_{1-y}Co_y)O_3$, $(Gd_{1-x}Sr_x)$ $(Fe_{1-y}Co_y)O_3$, $(Gd_{1-x}Ca_x) (Fe_{1-y}Co_y)O_3$, and mixtures thereof.

The cathode precursor layer may be formed from doped zirconia and/or doped ceria in which the dopants are Sc, Y, Ga, Ce, Sm, Gd, Ca and/or any Ln element, for instance $Zr_{0.78}Sc_{0.20}Y_{0.02}O_{2-\delta}$. Also optionally, metals and metal alloys such as FeCrMx and the like may be added, with Mx being selected from the group consisting of Ni, Ti, Ce, Mn, Mo, W, Co, La, Y, Al and mixtures thereof. In case of addition of the metals or metal alloys, the layer will possess oxygenion conductivity due to the layer comprising doped zirconia/ceria, as well as electronic conductivity due to the metal. If the layer comprises doped ceria, the layer will also exhibit some electrocatalytic properties.

In a further preferred embodiment, the cathode precursor layer may be a graded impregnation layer which is made from one or more of thin sheets comprising a mixture of oxide material and a metal alloy such as the ones mentioned above. Each sheet may have varying grain sizes and pore sizes and thicknesses of about 5 μm to 50 μm. The grading is achieved by for example laminating the metal support layer and various sheets, preferably 1 to 4 sheets, with different grain sizes and pore sizes by rolling or pressing. The resulting graded layer may for example have an average grain size ranging from about 5 to 10 μm in the sheet closest to the metal support layer and about 1 μm in the sheet closest to the electrolyte layer.

The electrolyte layer preferably comprises doped zirconia or doped ceria. More preferably, the electrolyte layer comprises a co-doped zirconia based oxygen ionic conductor. Said electrolyte layer has a higher oxygen ionic conductivity than a layer comprising pure YSZ, and a better long time stability than a layer comprising pure ScSZ. Doped ceria may be used alternatively. Other suitable materials for the formation of the electrolyte layer include ionic conducting materials mentioned above for the electrode precursor layers and also gallates and proton conducting electrolytes. The thickness of the electrolyte layer is preferably in the range of about 5 μm to about 50 μm and more preferably of about 10 to about 25 μm.

In a particular embodiment the invention encompasses that the anode layer is directly formed on the sintered multilayer structure comprising the metallic support layer, the cathode layer and the electrolyte layer. The step of forming an anode layer on the electrolyte layer is thereby conducted prior to forming a cathode layer by impregnating the cathode precursor layer. The formed anode layer is preferably a porous layer comprising NiO and doped zirconia or doped ceria. Alternatively, a redox stable anode may be deposited on the multilayer structure. Accordingly, in yet another embodiment the formed anode layer is a redox stable anode comprising Ni-zirconia, Ni-ceria, or any other metal oxide with oxygen ion or proton conductivity, for example materials selected from he group consisting of La (Sr) Ga (Mg) $O_{3-\delta}$, SrCe (Yb) $O_{3-\delta}$, BaZr (Y) $O_{3-\delta}$ and mixtures thereof, which have the property of being able to withstand redox cycling better than hitherto known anodes.

Surface passivation of Ni-surfaces of the redox stable anode is achieved by the composition comprising at least one additional oxide that is stable both under SOFC anode and cathode conditions e.g. $Al_2O_3$, $TiO_2$, $Cr_2O_3$, $Sc_2O_3$, $VO_x$, $TaO_x$, $MnO_x$, $NbO_x$, CaO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$ and mixtures thereof. Preferred oxides are $TiO_2$ and $Cr_2O_3$.

If, for example, $TiO_2$ or $Cr_2O_3$ is used $NiTi_2O_4$ and $NiCr_2O_4$ are formed in the redox stable anode layer during an additional sintering step which is conducted in connection with the deposition of said redox stable anode layer. The deposition is preferably conducted by spray painting a suspension of NiO—$Zr_{0.78}Sc_{0.20}Y_{0.02}Zr_{2-\delta}$—$TiO_2$ followed by sintering in air at about 1000° C. A redox stable microstructure is created during the initial reduction of the anode composition leaving a percolating Ni structure with randomly distributed fine $TiO_2$ particles (on average about 1 micrometer) In order to control the coverage of the nickel surfaces, the composition of the redox stable anode may comprise pre-reacted $NiTiO_3$ or $NiCr_2O_4$ or a mixture of both before processing. In this case the sintering after anode deposition may be conducted at about 750° C.

The addition of the oxides, furthermore, results in a decrease of the thermal expansion coefficient of the redox stable anode layer, which in turn strengthens the overall mechanical stability of the layers and the robustness of the resulting cell. Preferred oxides therefore are $Cr_2O_3$, $TiO_2$, $Al_2O_3$, and $Sc_2O_3$.

The amount of NiO in the anode composition is preferably in the range of about 45 wt % to 75 wt %, based on the total weight of the composition, and more preferably in the range of from about 50 wt % to 65 wt %. The amount of doped zirconia, doped ceria and/or a metal oxide with an oxygen ion or proton conductivity in the composition is preferably in the range of about 25 wt % to 55 wt %, based on the total weight of the composition, and more preferably in the range of from 40 wt % to 45 wt %. As a preferred material, $Zr_{1-x}M_xO_{2-\delta}$ may be used, with M=Sc, Ce, Ga or combinations thereof; Y may also be included; X is in the range of about 0.05 to about 0.3. Also applicable is $Ce_{1-x}M_xO_{2-\delta}$ with M=Ca, Sm, Gd, Y and/or any Ln element, or combinations thereof; X is in the range of about 0.05 to about 0.3.

The amount of the at least one oxide in the composition is preferably in the range of about 1 to 25 wt %, based on the total weight of the composition, and more preferably in the range of from about 2 wt % to 10 wt %.

In a further preferred embodiment, the anode composition additionally comprises an oxide selected from the group consisting of $Al_2O_3$, $Co_3O_4$, $Mn_3O_4$, $B_2O_3$, CuO, ZnO, $Fe_3O_4$, $MoO_3$, $WO_3$, $Ga_2O_3$, and mixtures thereof. The amount thereof in the composition is preferably in the range of about 0.1 to 5 wt % based on the total weight of the composition, and more preferred in the range of from 0.2 wt % to 2 wt %. The additional oxides are used as sintering aids to facilitate the reaction during the sintering step.

The oxides above consisting of $Al_2O_3$, $Co_3O_4$, $Mn_3O_4$, $B_2O_3$, CuO, ZnO, $Fe_3O_4$, $MoO_3$, $WO_3$, $Ga_2O_3$ and mixtures thereof may also be added to the cathode precursor layer to control shrinkage during sintering.

Other suitable materials for the metallic support layer, the electrode precursor layer, the electrolyte layer and the anode and cathode layer may be selected from the materials disclosed in our WO-A-2005/122300.

The individual layers may be tape cast and subsequently laminated together. Alternatively, the individual layers may for example be rolled from a paste or the like. Other application methods of the respective layers include spraying, spray-painting, screen-printing, electrophoretic deposition (EPD) and pulsed laser deposition (PLD).

The sintering of the metal supported cells is preferably conducted at reducing conditions and the temperatures are preferably in the range of about 900° C. to 1500° C., more preferably in the range of about 1000° C. to 1300° C.

The barrier material may also be applied in any other kind of SOC for instance in an anode supported cell.

Accordingly, we also provide a reversible solid oxide fuel cell obtainable by a method comprising the steps of:
  providing an anode support layer;
  forming an anode precursor layer on the anode support layer;
  forming an electrolyte layer on the anode precursor layer;
  forming a cathode precursor layer on the electrolyte;
  sintering the obtained multilayer structure;
  in any order conducting the steps of:
    forming an anode layer by impregnating the anode precursor layer, and
    forming a cathode layer by impregnating the cathode precursor layer;
characterised in that the method further comprises prior to forming said cathode and anode layer,
  impregnating a precursor solution or suspension of a barrier material at least into the cathode precursor layer and subsequently conducting a heat treatment.

There is no metal support. In this embodiment the support is provided by the anode and hence barrier material is only required to protect against interface reactions between cathode materials and electrolyte material as described above.

In another embodiment of an anode supported cell we also provide a reversible solid oxide fuel cell obtainable by a method comprising the steps of:
  providing an anode support layer;
  forming an anode layer on the anode support layer;
  forming an electrolyte layer on the anode layer;
  forming a cathode precursor layer on the electrolyte;
  sintering the obtained multilayer structure;
  forming a cathode layer on the electrolyte layer by impregnating the cathode precursor layer;
characterised in that the method further comprises prior to forming said cathode layer,
impregnating a precursor solution or suspension of a barrier material into the cathode precursor layer and subsequently conducting a heat treatment.

BRIEF DESCRIPTION OF THE DRAWINGS

The accompanying FIGURE shows a schematic drawing of a SOFC with a metallic support, cathode layer, electrolyte layer and barrier material incorporated therein.

DETAILED DESCRIPTION OF THE INVENTION

In the FIGURE the resulting SOFC comprises a metallic support 1, a precursor layer for the impregnation of the cathode 2, an electrolyte layer 3, an anode layer 4 and a barrier material 5 (represented by dots in the FIGURE) being distributed on the surfaces throughout the metallic support, the cathode layers and on the electrolyte surface facing the cathode. The electrolyte layer is dense (not porous) and barrier material is therefore only found on the surface facing the cathode side.

After sintering of the half cell comprising the metallic support, optional intermediate layers, cathode precursor and electrolyte, the barrier material is impregnated into the porous structure of the half cell. The barrier material, preferably doped ceria, penetrates and covers all external and internal surfaces in the porous half cell. A subsequent heat treatment of the half cell fixes the barrier material within and throughout the half cell. After said first impregnation with barrier material a second impregnation is conducted, this time by impregnating an active cathode in the form of a pure catalyst such as LSC which has catalytic activity for oxygen reduction. On top of the electrolyte, i.e. on its opposite side, the anode layer is formed. A dual protective effect of the metallic support brought about by the two step-impregnation is thereby achieved.

EXAMPLES

Example 1

Preparation of a Reversible SOFC with Porous Cathode Impregnation Layer

A metallic support layer was tape-cast from a powder suspension comprising a Fe22Cr alloy followed by a drying step. The support layer had a thickness of 300 μm.

Thereon, a porous layer comprising $Zr_{0.78}Sc_{0.20}Y_{0.02}O_{2-\delta}$ for later impregnation of the cathode was formed by spray painting. The layer had a thickness of 50 μm and a porosity of about 40% with an average pore size of about 1-3 μm. Then, an electrolyte layer comprising $Zr_{0.78}Sc_{0.20}Y_{0.02}O_{2-\delta}$ was formed thereon also by spray painting. The electrolyte layer had a thickness of about 10 μm.

The obtained multi-layer structure was dried followed by sintering under reducing conditions at about 1300° C.

After sintering a nitrate solution of gadolinium doped ceria $(Gd_{0.1}Ce_{0.9})O_{2-\delta}$ (barrier material) is vacuum impregnated, i.e. vacuum infiltrated into the metal support and the cathode precursor layer two times. After impregnation the sample is heat treated for 1 hour at 400° C.

A nitrate solution of $(Gd_{0.1}Ce_{0.9})O_{2-\delta}$ and $(La_{0.6}Sr_{0.4})_{0.98}(Co_{0.2}Fe_{0.8})O_{3-\delta}$ (CGO and LSCF) was subsequently impregnated in to the cathode precursor layer by vacuum infiltration. The nitrates were subsequently decomposed at 400° C. for 2 hours. The impregnation procedure was repeated 5 times.

Afterwards, an NiO—$(Gd_{0.1}Ce_{0.9})O_{2-\delta}$ anode was spray deposited on the electrolyte surface of the multilayer structure. The resulting anode had a volume concentration of about 45% Ni and 55% $(Gd_{0.1}Ce_{0.9})O_{2-\delta}$.

Example 2

As Example 1, but with the barrier material being impregnated two to four times in the form of a colloidal suspension of $(Gd_{0.1}Ce_{0.9})O_{2-\delta}$ particles with an average particle size of 30-80 nm. Prior to impregnation of the cathode the sample is heat treated for 1 hour at 700° C.

The cell is completed as described in Example 1.

Example 3

As Example 1 except that the impregnated cathode only comprises $(La_{0.6}Sr_{0.4})_{0.98}(Co_{0.2}Fe_{0.8})O_{3-\delta}$ (no CGO) and is impregnated in the form of a colloidal suspension having an average particle size of 30-100 nm.

The cell is completed as described in Example 1.

Example 4

Preparation of a Reversible SOFC with Cathode Impregnation into the Metallic Support A metallic support layer was tape-cast from a powder suspension comprising a Fe22Cr alloy followed by a drying step. The support layer had a thickness of 300 μm.

Then, an electrolyte layer comprising $Zr_{0.78}Sc_{0.20}Y_{0.02}O_{2-\delta}$ was formed thereon also by spray painting. The electrolyte layer had a thickness of about 10 μm.

The obtained multi-layer structure was dried followed by sintering under reducing conditions at about 1300° C.

After sintering a nitrate solution of the barrier material $(Gd_{0.1}Ce_{0.9})O_{2-\delta}$ is vacuum impregnated in to the metal support and onto the electrolyte layer two times. After impregnation the sample is heat treated for 1 hour at 400° C.

A suspension of $(Gd_{0.1}Ce_{0.9})O_{2-\delta}$ and $(La_{0.6}Sr_{0.4})_{0.98}(Co_{0.2}Fe_{0.8})O_{3-\delta}$ (CGO and LSCF) was subsequently impregnated in to the metal support by vacuum infiltration. The impregnation procedure was repeated 5 times.

Afterwards, an $NiO-Zr_{0.78}Sc_{0.20}Y_{0.02}Zr_{2-\delta}$ anode was screen printed on the electrolyte surface of the multilayer structure. The resulting anode had a volume concentration of about 45% Ni and 55% $Zr_{0.78}Sc_{0.20}Y_{0.02}Zr_{2-\delta}$.

Example 5

A metallic support layer was tape-cast from a powder suspension comprising a FeCrMn0.01 alloy, followed by a drying step. The support layer had a thickness of 400 μm.

After drying of the support layer, a layer for later electrode impregnation (cathode precursor layer of about 50 micrometer) was deposited by screen-printing an ink comprising a 1:1 volume mixture of $Zr_{0.78}Sc_{0.20}Y_{0.02}Zr_{2-\delta}$ and a Fe24CrMn0.01. The layer had a thickness of 50 μm. Finally an electrolyte layer comprising $Zr_{0.78}Sc_{0.20}Y_{0.02}O_{2-\delta}$ was deposited by spray painting.

After sintering of the obtained multilayer structure, a barrier material was impregnated two to four times in the form of a colloidal suspension of $(Gd_{0.1}Ce_{0.9})O_{2-\delta}$ particles with an average particle size of 30-80 nm.

A redox stable anode was deposited by spray painting a suspension of $NiO-Zr_{0.78}Sc_{0.20}Y_{0.02}Zr_{2-\delta}-TiO_2$. (52:43:5 wt %, respectively) followed by an additional sintering step at about 1000° C. in air. During the sintering of the anode, $NiTi_2O_4$ was formed in the anode structure. The redox stable microstructure was created during the initial reduction of the anode leaving a percolating Ni structure with randomly distributed fine $TiO_2$ particles (~1 μm).

The cathode was impregnated as described in Example 1.

Example 6

Same method as in Example 5, but with the composition for the redox stable anode comprising pre-reacted $NiTiO_3$ before processing. The sintering after anode deposition is performed at around 750° C.

Example 7

Same method as in Example 6, but with the composition for the redox stable anode comprising $NiCr_2O_4$ before processing.

Example 8

Same method as in Example 6, but with the composition for the redox stable anode comprising a mixture of pre-reacted $NiTiO_3$ and $NiCr_2O_4$ to control the coverage of the nickel surfaces.

Example 9

Same method as in Example 6, but with the composition for the redox stable anode comprising $Sc_2O_3$ as the added oxide.

Example 10

Same method as in Example 5, but with the composition for the redox stable anode comprising doped ceria instead of zirconia.

Example 11

Same as Example 1, wherein the metal support sheet was obtained by tape-casting a Fe22CrTi0.04 alloy powder suspension mixed with 5 vol % $Zr_{0.94}Y_{0.06}O_{2-\delta}$.

The cell was completed as described in Example 5.

Example 12

A metallic support layer was tape-cast from a powder suspension comprising a Fe22Cr alloy followed by a drying step. The support layer had a thickness of 400 μm.

A graded cathode precursor layer was formed thereon from three thin sheets comprising $Zr_{0.78}Sc_{0.20}Y_{0.02}Zr_{2-\delta}$ and a Fe22Cr alloy. The sheets with varying grain sizes, varying pore sizes and thicknesses of about 20 μm were manufactured by tape-casting the respective powder suspensions. The cell structure was made by laminating the metal support sheet and the three impregnation precursor layers sheets by rolling and pressing. The obtained impregnation layer had a graded structure with pore size of from 10 μm in the layer directly on top of the metal support layer, and a pore size of 2 μm at the layer on which the electrolyte layer was formed.

The cell was completed as described in Example 4.

Example 13

As Example 1, but with the addition of $Al_2O_3$ to the cathode precursor layer as a sintering additive so as to control the shrinkage during the sintering step.

The cell was completed as described in Example 1.

Example 14

A metallic support layer was formed by rolling a Fe22CrNd0.02Ti0.03 alloy paste followed by a drying step. The support layer had a thickness of 800 μm.

A layer for cathode impregnation (cathode precursor layer) having a thickness of 30 μm and an electrolyte layer having a thickness of 10 μm were deposited by spray painting. Both layers were formed from a composition of $(Gd_{0.1}Ce_{0.9})O_{2-\delta}$. After sintering a barrier layer was impregnated as described in Example 1. This was followed by impregnation of a nitrate solution of La, Sr, Co and Fe into the porous ceria layer by vacuum infiltration in order to form the cathode layer. After drying and cleaning of the electrolyte surface, a NiO—$(Sm_{0.1}Ce_{0.9})O_{2-\delta}$ anode was deposited by screen printing.

Example 15

A support was manufactured as explained in Example 1. After drying of the support, a layer for cathode impregnation having a thickness of 70 μm, a $Zr_{0.78}Sc_{0.20}Y_{0.02}O^{2-\delta}$ electrolyte layer having a thickness of 10 μm and finally another layer for anode impregnation (anode precursor layer) having a thickness of 30 μm were deposited by spray painting. Both impregnation layers (cathode and anode precursor layers) were formed from a composition of $Zr_{0.78}Sc_{0.20}Y_{0.02}O_{2-\delta}$ and 40 vol % Fe22Cr powder with an approximate porosity of 40 vol %.

Samples were subsequently punched out in the desired dimensions, and the samples were sintered under controlled reducing conditions.

After sintering a suspension of the barrier material $(Cd_{0.1}Ce_{0.9})O_{2-\delta}$ is vacuum impregnated into the metal support and the cathode and anode precursor layers as well as onto the electrolyte layer three times. After impregnation the sample is heat treated for 1 hour at 400° C.

The metal support layer was masked and a solution of Ni—Ce—, Gd-nitrates was impregnated into the anode impregnation precursor layer by vacuum infiltration. The resulting anode had a volume concentration of 40% Ni and 60% $(Gd_{0.1}Ce_{0.9})O_{2-\delta}$. After drying, the mask was removed, the anode layer masked and a nitrate solution used to impregnate the cathode precursor layer by vacuum infiltration so that the resulting cathode composition was $(Gd_{0.6}Sr_{0.4})_{0.99}(Co_{0.2}Fe_{0.8})O_{3-\delta}$.

Example 16

A cell structure was manufactured as described in Example 1. The cathode layer was formed by pressure impregnation of a nano-sized suspension with average size of particles in the range 30-80 nm of $(La_{0.6}Sr_{0.4})_{0.99}(Co_{0.2}Fe_{0.8})O_{3-\delta}$.

Example 17

Preparation of Anode Supported SOFC with Porous Cathode Impregnation Layer

A NiO—YSZ anode support layer was tape-cast from a powder suspension comprising a NiO and YSZ followed by a drying step. The support layer had a thickness of 400 μm.

Thereon, an anode layer comprising NiO and $Zr_{0.78}Sc_{0.20}Y_{0.02}O_{2-\delta}$ was formed by screen printing. The layer had a thickness of 25 μm and a porosity of about 20% with an average pore size of about 1-3 μm. Then, an electrolyte layer comprising $Zr_{0.78}Sc_{0.20}Y_{0.02}O_{2-\delta}$ was formed thereon, also by screen printing. The electrolyte layer and had a thickness of about 10 μm.

A porous layer comprising $Zr_{0.78}Sc_{0.20}Y_{0.02}O_{2-\delta}$ for later impregnation of the cathode (cathode precursor layer) was formed by screen printing on to the electrolyte layer. The layer had a thickness of 50 μm and a porosity of about 40% with an average pore size of about 1-3 μm.

The obtained multilayer structure was dried followed by sintering at about 1300° C.

After sintering a nitrate solution of gadolinium doped ceria $(Gd_{0.1}Ce_{0.9})O_{2-\delta}$ (barrier material) is vacuum impregnated, i.e. vacuum infiltrated, into the cathode precursor layer two times. After impregnation the sample is heat treated for 1 hour at 400° C.

To form the cathode layer a nitrate solution of $(Gd_{0.1}Ce_{0.9})O_{2-\delta}$ and $(La_{0.6}Sr_{0.4})_{0.98}(Co_{0.2}Fe_{0.8})O_{3-\delta}$ (CGO and LSCF) was subsequently impregnated into the cathode precursor layer by vacuum infiltration. The nitrates were subsequently decomposed at 400° C. for 2 hours. The impregnation procedure was repeated 5 times.

Example 18

Preparation of a Reversible SOFC with Porous Cathode and Anode Impregnation Layer.

A NiO—YSZ anode support layer was tape-cast from a powder suspension comprising NiO and YSZ followed by a drying step. The support layer had a thickness of 400 μm.

Thereon, a porous layer for anode impregnation (anode precursor layer) comprising $Zr_{0.78}Sc_{0.20}Y_{0.02}O_{2-\delta}$ was formed by spray painting. The layer had a thickness of 25 μm and a porosity of about 40% with an average pore size of about 2-4 μm. Then, an electrolyte layer comprising $Zr_{0.78}Sc_{0.20}Y_{0.02}O_{2-\delta}$ was formed thereon also by spray painting. The electrolyte layer and had a thickness of about 10 μm.

A porous layer comprising $Zr_{0.78}Sc_{0.20}Y_{0.02}O_{2-\delta}$ for later impregnation of the cathode (cathode precursor layer) was formed by spray painting on to the electrolyte layer. The layer had a thickness of 50 μm and a porosity of about 40% with an average pore size of about 1-3 μm.

The obtained multi-layer structure was dried followed by sintering at about 1300° C.

After sintering a nitrate solution of gadolinium doped ceria $(Gd_{0.1}Ce_{0.9})O_{2-\delta}$ (barrier material) is vacuum impregnated, i.e. vacuum infiltrated, into the cathode precursor layer two times. After impregnation the sample is heat treated for 1 hour at 400° C.

The anode support layer was masked, and a solution of Ni—Ce—, Gd-nitrates was impregnated into the anode impregnation precursor layer by vacuum infiltration. The resulting anode had a volume concentration of 40% Ni and 60% $(Gd_{0.1}Ce_{0.9})O_{2-\delta}$. After drying, the mask was removed, the anode layer masked and a nitrate solution used to impregnate the cathode precursor layer by vacuum infiltration so that the resulting cathode composition was $(La_{0.6}Sr_{0.4})_{0.99}(Co_{0.2}Fe_{0.8})O_{3-\delta}$.

The invention claimed is:

1. A reversible solid oxide fuel cell obtainable by a method comprising the steps of:
   providing a metallic support layer;
   forming a cathode precursor layer on the metallic support layer;
   forming an electrolyte layer on the cathode precursor layer;
   sintering the obtained multilayer structure;
   in any order conducting the steps of:
   forming a cathode layer by impregnating the cathode precursor layer, and
   forming an anode layer on the electrolyte layer;

wherein the method further comprises, prior to forming said cathode layer,
impregnating a precursor solution or suspension of a barrier material into the metallic support layer and the cathode precursor layer and subsequently conducting a heat treatment.

2. A reversible solid oxide fuel cell according to claim 1 wherein the step of forming an anode layer on the electrolyte layer is conducted prior to the step of forming a cathode layer and comprises:
forming an anode precursor layer on the electrolyte layer prior to sintering the obtained multilayer structure,
after sintering the obtained multilayer structure, forming the anode layer by impregnating the anode precursor layer with a precursor solution or suspension comprising compounds selected from the group consisting of Ni, Ce, Gd and mixtures thereof; the method further comprising, prior to forming said cathode and anode layers,
impregnating the precursor solution or suspension of a barrier material into the metallic support layer, cathode precursor layer and anode precursor layer, and subsequently conducting a heat treatment.

3. A reversible solid oxide fuel cell according to claim 1 wherein the impregnating step of barrier material is conducted by vacuum infiltration.

4. A reversible solid oxide fuel cell according to claim 1 wherein the barrier material comprises doped ceria.

5. A reversible solid oxide fuel cell according to claim 1, wherein the precursor solution or suspension of barrier material is a nitrate solution of doped ceria or a colloidal suspension of doped ceria particles having average diameter of 2-100 nm.

6. A reversible solid oxide fuel cell according to claim 1 further comprising providing one or more intermediate transition layers between said metallic support layer and said cathode precursor layer.

7. A reversible solid oxide fuel cell according to claim 1, wherein the metallic support layer comprises a FeCrMx alloy, wherein Mx is selected from the group consisting of Ni, Ti, Ce, Mn, Mo, W, Co, La, Y, Al, and mixtures thereof; and from about 0 to about 50 volt metal oxides and wherein the metal oxide is selected from the group of doped zirconia, doped ceria, Mg/Ca/SrO, CoOx, MnOx, $B_2O_3$, $CuO_x$, $ZnO_2$, $VO_x$, $Cr_2O_3$, FeO, $MoO_x$, $WO_x$, $Ga_2O_3$, $Al_2O_3$, $TiO_2$, and mixtures thereof.

8. A reversible solid oxide fuel cell according to claim 1, wherein the cathode layer comprises doped zirconia and/or doped ceria and/or a FeCrMx alloy, and further at least one material selected from the group consisting of: $(La_{1-x}Sr_x)_sMnO_{3-\delta}$ and $(A_{1-x}B_x)_sFe_{1-y}Co_yO_{3-\delta}$ where A=La, Gd, Y, Sm, Ln or mixtures thereof, and B.dbd.Ba, Sr, Ca, or mixtures thereof, and Ln=lanthanides.

9. A reversible solid oxide fuel cell according to claim 1, wherein the electrolyte layer comprises doped zirconia or doped ceria.

10. A reversible solid oxide fuel cell according to claim 1, wherein the formed anode layer is a redox stable anode comprising Ni-zirconia or Ni-ceria or materials selected from the group consisting of La(Sr)Ga(Mg)O3-δ, SrCe(Yb)O3-δ, BaZr(Y)O3-δ and mixtures thereof.

* * * * *